No. 809,275. PATENTED JAN. 2, 1906.
C. S. BROWN & J. N. CLOUSE.
SPIRIT LEVEL.
APPLICATION FILED JAN. 14, 1904. RENEWED DEC. 1. 1905.
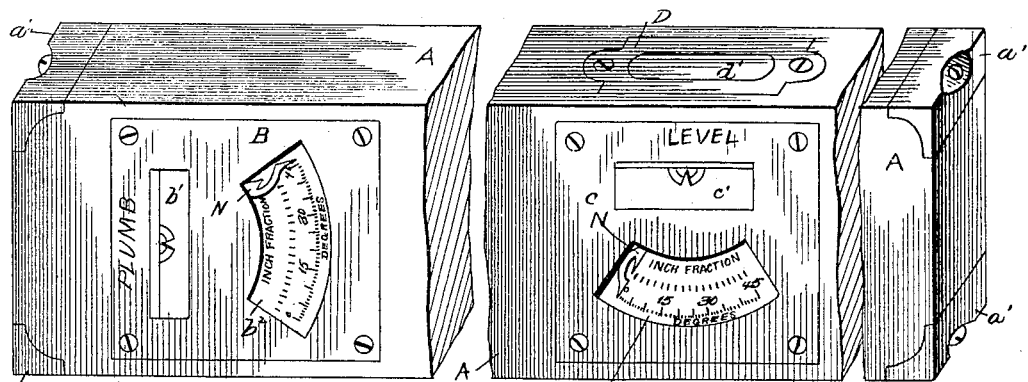
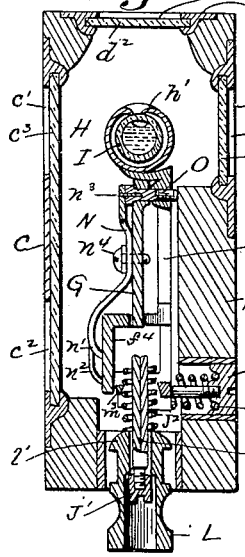
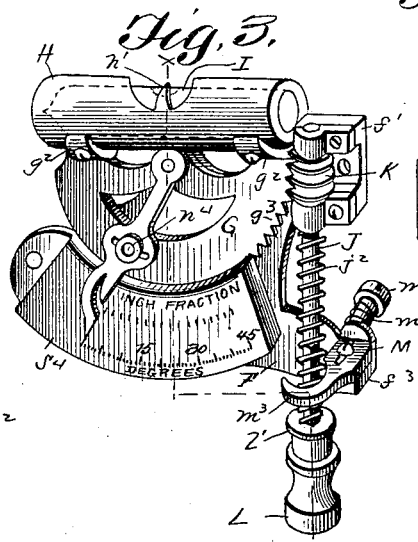
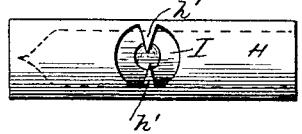
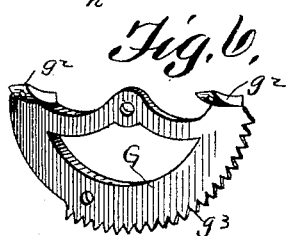
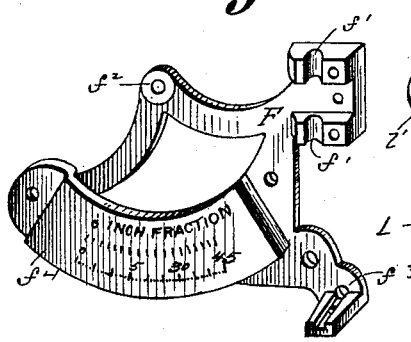
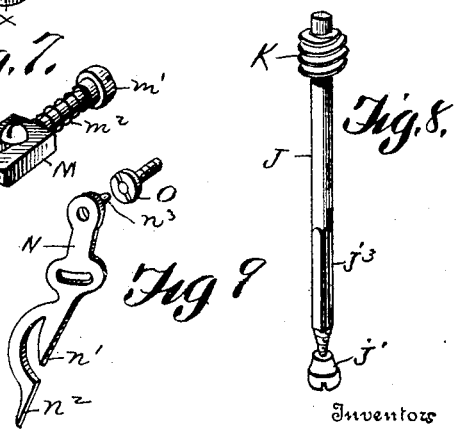
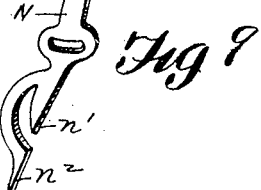
Witnesses
R. A. Boswell
Chas. M. Havell
Inventors
C. S. Brown
J. N. Clouse
By Joseph N. Clouse
Attorney

UNITED STATES PATENT OFFICE.

CALVIN S. BROWN, OF TOLEDO, OHIO, AND JOSEPH N. CLOUSE, OF ST. LOUIS, MISSOURI.

SPIRIT-LEVEL.

No. 809,275.  Specification of Letters Patent.  Patented Jan. 2, 1906.

Application filed January 14, 1904. Renewed December 1, 1905. Serial No. 290,331.

*To all whom it may concern:*

Be it known that we, CALVIN S. BROWN, residing at Toledo, Lucas county, State of Ohio, and JOSEPH N. CLOUSE, residing at St. Louis, in the State of Missouri, citizens of the United States, have invented certain new and useful Improvements in Spirit-Levels; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in spirit-levels; and the object of our improvements is to provide a level that combines certain desirable conveniences for the workman with the substantial and accurate construction of a reliable and practical tool, providing a quick and accurate adjustment of sufficient range to meet all practical demands in measuring degrees of incline or deflections from the perpendicular, and also a scale of incline or elevation indicating the fraction of an inch rise per running foot. We attain these objects by the mechanism illustrated in accompanying drawings, in which—

Figure 1 is a perspective view of the level complete in three sections, two sections of beam removed to shorten its length. Fig. 2 is a cross-section of the level through the works on the line X X, Fig. 3. Fig. 3 is a perspective view of the works complete separate from the beam. Fig. 4 is a perspective detail view of the bed-frame. Fig. 5 is a perspective detail view of the tube and the spirit-vial. Fig. 6 is a perspective detail view of the gear-segment. Fig. 7 is a perspective detail view of the thumb-nut and its compression lock-plate. Fig. 8 is a perspective detail view of the worm-shaft and nut. Fig. 9 is a perspective detail view of the index-finger and pivot-screw.

In all the views like letters refer to like parts.

This level is designed more particularly to be of large dimensions for the use of master mechanics, mechanical engineers, brick-masons, and in all places where accurate work is required on inclines from the level and deflections from the vertical line are desired, ranging from one to four feet long.

A is a wooden beam to which the various parts are secured. The exterior of the beam A is provided with corner-plates $a'$ $a'$ $a'$ $a'$, which are common to all wooden level-beams. It is also provided with plates B, C, D, and E, which have openings through them which are covered with glass plates fitted into gains on the inner side of them. These openings are of a suitable size and shape to admit of seeing conveniently the movements of the bubble in the spirit-vial and to see the scales and pointers and adjust them as desired. This beam is usually supplied with a level-movement in the middle of it and a plumb-movement at one end of it. Under these plates B C D and between them there are mortises or cavities suitable to receive the movements complete, as shown in Fig. 3. This movement, as shown in Fig. 3, is placed in said mortise and screwed securely to said beam through the holes in the bed plate or frame. (See Fig. 4.) The location of said movement is such that the tube H, with its spirit-vial, is directly under the plate D, with its opening $d'$, as shown in Fig. 2, and its sides are directly opposite to the openings $c'$ and $e'$ in the plates C and E on the sides of the beam and the scale segment-plate opposite to the curved opening $c^2$ also, so that the thumb-nut L when compressed comes flush with the edge face of the beam on its under edge and the nut $m'$ on the compression lock-plate flush with the surface of the beam on its back side. This is the description of the location of the movement called the "level-movement" in the center of the beam, and the location of the movement in the end of the beam, which is called the "plumb-movement," is similar, only the openings in the plates B and E stand crosswise of the beam and the movements of the bubble are observed from the two sides, there being no opening on the edge. Also the index is reversed, so that the index-finger works from right to left, while in the level-movement the index-finger works from the left to the right, as shown in Fig. 3. This we have given as a general description showing the general view of the level and the location of its parts. We will now enlarge into a special detail description of the parts and their working relation to each other.

F is a bed-frame which is provided with suitable means for attaching the various parts to it, such as the bearings $f'$ $f'$, the hub $f^2$, the hanger $f^3$, and the scale segment-plate $f^4$.

G is a gear-segment which is provided with a central pivot-hub $g'$, by means of which it is pivoted to the hub $f^2$ of the bed-frame F, two saddle-arms $g^2$ $g^2$, to which is screwed the tube H, and a series of teeth or cogs $g^3$, which work in the worm-gear K. The tube H is provided with an opening on its top side and two discriminating points $h'$ $h'$, which cause the operator to discern easily the center of the bubble in the spirit-vial I, which is packed inside of it with a close packing of felt, cork, rubber, or other soft compressible material.

The shaft J is provided with a worm-gear K, a nut $j'$, a square portion $j^3$, and journals to fit in the bearings $f'$ $f'$ of the bed-frame F, a coiled spring $j^2$, and a thumb-nut L, sliding on the square portion $j^3$ of the shaft J.

A compression lock-plate M, provided with a stop-nut $m'$, a coiled spring $m^2$, and a yoke-hook $m^3$ to catch over the flange $l'$ on the thumb-nut L, is pivoted so as to slide on the hanger $f^3$ on the bed-frame F by a rib and a slot on the lock-plate M and a groove and a screw in the hanger $f^3$.

The index-finger N is provided with a double pointer $n'$ $n^2$—one for each of the scales on the segment-plate $f^4$—a center pivot $n^3$, which has its bearing in the head of the pivot-screw O, and a curved slot through which the screw $n^4$ passes to bind it to the gear-segment G when it is adjusted to the scale as desired.

Having thus described each of the detail parts in a general way, it is necessary next to put the parts in their proper places and describe their working advantages and points of novelty. First, place the tube H in the two saddle-arms $g^2$ $g^2$ on the gear-segment G and secure it by the screws, as shown in Fig. 3. Then place the gear-segment G with its hub $g'$ on the hub $f^2$ of the bed-frame F and secure the two together by the pivot-screw O, which is screwed down to a shoulder against the hub $f^2$, leaving the gear-segment just free to turn snugly on the screw O. Then take the shaft J and put on it the coiled spring $j^2$ and the thumb-nut L and retain it there by the nut $j'$, leaving the thumb-nut L free to slide on the square portion $j^3$ of the shaft. Then place the said shaft in the bearings $f'$ $f'$ of the bed-frame F and secure it there by the caps and screws, as shown in Fig. 3. Then place the lock-plate M with its nut $m'$ and spiral spring $m^2$ in the hanger $f^3$ on the bed-frame F, with its yoke-hook $m^3$ around the hub of the thumb-nut L, and force the nut on against the spring until the yoke-hook $m^3$ catches behind the flange $l'$ on the thumb-nut and holds the said nut in position. Then place the index-finger N with its center pivot $n^3$ in its bearing in the pivot-screw O and secure it to the gear-segment G by the screw and washer $n^4$ through its curved slot.

The scale segment-plate $f^4$ is provided with two separate scales, the one indicating the degrees of a circle, giving a segment of forty-five degrees, and the other indicating the fractions of an inch elevation under the end of a one-foot beam, which would give the rise or fall per foot to any desired incline. When the level is used on a level surface, the index-finger or pointer registers at "0" on both of the scales, so that each scale starts from the level, and if the workman desires to work by the degrees he sets the pointer to his desired number of degrees on the scale and pays no attention to the other pointer or scale, and if he desires to work to the scale of the fractions of an inch he sets the pointer to the desired number of fractions on the scale and pays no attention to the other pointer or scale.

Now having put together the various parts of the level-movement so that they work as intended in unison with each other, as designed, the manipulation is as follows: The stop-nut $m'$ is flush with the surface of the beam and the thumb-nut L is flush with the surface of the beam. By pressing in the stop-nut $m'$ the thumb-nut L is released from the yoke-hook $m^3$ and flies out in extended form, as shown in Fig. 2. Then by rotating the thumb-nut L the index-finger or pointer may be moved back or forward over the scales and may be set, as desired, at any point on the scale. The rotating of the thumb-nut L causes the worm-gear K to rotate the gear-segment G, to which the index-finger or pointer N is attached, and the tube H, with its spirit-vial I attached, thus causing the three parts to move in unison with each other, so that when the spirit-vial is level and the index-finger is set to indicate "0" then any deflection of the spirit-vial I will be indicated on the scale. When the desired adjustment is made, press in the thumb-nut L flush with the surface of the beam, and it will be held there by the yoke-hook $m^3$. It is shown that the movement on the end called the "plumb" is set crosswise of the beam and is arranged with the "0" of the scale on the right and the index-finger or pointer N moving on the scale from right to left; otherwise it is set the same in the beam, the difference in the crosswise position of the spirit-vial being made by the worm-gear K working in the other end of the gear-segment teeth $g^3$ and the index-finger being adjusted to the "0" mark when the spirit-vial is adjusted to level on the plumb-line, thus making it easy and inexpensive to use the same construction of parts for both the level and the plumb movements.

In view of the state of the art we are aware that there are various constructions of levels and complicated instruments with levels attached. We do not, therefore, claim such a construction broadly; but What we do claim as new, and desire to secure by Letters Patent, is—

1. In a spirit-level movement fitted to and secured in the mortise in the wooden beam, the combination of the bed-frame F to which is pivoted the various working parts consisting of the gear-segment G with its tube H and spirit-vial I and double index-finger N also the shaft J with its worm-gear K, thumb-nut L spring $j^2$ and compression lock-plate M with its nut $m'$, spring $m^2$, and hook $m^3$, all working together to operate the spirit-vial I and the double index-finger N, substantially as shown and described.

2. In a spirit-level movement for the purpose of obtaining inclines from the level in degrees or in fractions of inches and deflections from a vertical line in the plumb in degrees or in fractions of inches, the scale segment-plate $f^4$ provided with a double scale in combination with the double index-finger N, the gear-segment G, the spirit-vial I, and its tube H, and the operating-shaft J with its worm-gear K, spring $j^2$ and thumb-nut L, substantially as shown and described.

3. In a spirit-level movement the works provided with a bed-plate secured to the beam in its mortise the said works consisting of the gear-segment G, provided with the spirit-vial I and tube H, the worm-gear K with its shaft J provided with spring $j^2$ nut $j'$ and squared portion $j^3$ and the thumb-nut L with its flange $l'$ sliding on the said squared portion $j^3$, also the compression lock-plate M, with its stop-nut $m'$, coiled spring $m^2$ and yoke-hook $m^3$, said thumb-nut L and stop-nut $m'$ extending to the surface of the beam forms a means of operating the gear-segment G, with its parts attached, substantially as shown and described.

4. In a spirit-level, the general combination of the wooden beam with its mortises, the perforated metal plates with glass plates back of them covering the said mortises, the movements secured in the said mortises consisting of the bed-frame having a double scale segment-plate, the gear-segment plate pivoted to the said bed-frame and mounted with the tube and spirit-vial, the adjustable double index-finger secured to the said gear-segment, the worm-gear, coiled spring, and thumb-nut for operating said segment-gear, the compression lock-plate with its stop-nut coiled spring and yoke-hook holding said thumb-nut in compressed position, substantially as shown and specified.

In testimony whereof we affix our signatures in presence of two witnesses.

CALVIN S. BROWN.
JOSEPH N. CLOUSE.

Witnesses as to the signature of Calvin S. Brown:
C. J. SPEAR,
WILLARD C. COLE.

Witnesses as to the signature of Joseph N. Clouse:
C. L. WEBER,
L. S. ELMORE.